US009845833B2

(12) United States Patent
Skaggs et al.

(10) Patent No.: US 9,845,833 B2
(45) Date of Patent: Dec. 19, 2017

(54) FAN CLUTCH

(71) Applicants: Bruce A. Skaggs, Rockford, IL (US); Scott Orsinger, Roscoe, IL (US)

(72) Inventors: Bruce A. Skaggs, Rockford, IL (US); Scott Orsinger, Roscoe, IL (US)

(73) Assignee: GKN Rockford, Inc., Loves Park, IL (US)

( * ) Notice: Subject to any disclaimer, the term of this patent is extended or adjusted under 35 U.S.C. 154(b) by 129 days.

(21) Appl. No.: 14/875,306

(22) Filed: Oct. 5, 2015

(65) Prior Publication Data

US 2016/0097431 A1 Apr. 7, 2016

Related U.S. Application Data

(60) Provisional application No. 62/060,358, filed on Oct. 6, 2014.

(51) Int. Cl.
| | |
|---|---|
| *F16D 25/08* | (2006.01) |
| *F16D 25/12* | (2006.01) |
| *F01P 7/08* | (2006.01) |
| *F16D 13/52* | (2006.01) |
| *F16C 1/00* | (2006.01) |
| *F16D 13/74* | (2006.01) |

(52) U.S. Cl.
CPC ............ *F16D 25/123* (2013.01); *F01P 7/085* (2013.01); *F16C 1/00* (2013.01); *F16D 13/52* (2013.01); *F16D 25/082* (2013.01); *F16D 25/12* (2013.01); *F16D 13/74* (2013.01); *F16D 25/083* (2013.01); *F16D 2250/0084* (2013.01); *F16D 2300/0214* (2013.01)

(58) Field of Classification Search
CPC ...... F16D 25/082; F16D 25/083; F16D 25/12; F16D 25/123; F16D 13/74; F16D 2250/0084; F16D 2300/0214; F01P 7/046; F01P 7/085
See application file for complete search history.

(56) References Cited

U.S. PATENT DOCUMENTS

| | | | |
|---|---|---|---|
| 3,804,219 A | 4/1974 | Cummings, III | |
| 4,425,879 A * | 1/1984 | Shadday et al. ........ | F01P 7/085 123/41.12 |
| 4,899,861 A | 2/1990 | Cummings, III | |
| 5,061,089 A | 10/1991 | Bair et al. | |
| 5,560,462 A | 10/1996 | Gustin | |
| 5,667,045 A | 9/1997 | Cummings, III | |

(Continued)

*Primary Examiner* — Richard Lorence
(74) *Attorney, Agent, or Firm* — Reinhart Boerner Van Deuren P.C.

(57) ABSTRACT

A fan clutch assembly includes several features. A first feature relates to a lubrication passage that runs through the clutch package and has a return collection passage that extends through the operating piston. As a result, pitot tubes employed behind the piston may not be necessitated. Additionally, an anti-tamper device may be installed on the lead screw body to prevent adjustment of the fan hub and unintentional adjustment of the load carried on various bearings contained within the fan clutch assembly. Additionally, to position the speed sensor appropriately, a transfer shaft is provided that extends from the fan hub and/or lead screw back to the backside where a sensor is provided. This transfer shaft can be adjusted to precisely locate the sensor target relative to the sensor.

24 Claims, 13 Drawing Sheets

(56) References Cited

U.S. PATENT DOCUMENTS

| | | |
|---|---|---|
| 5,697,743 A | 12/1997 | Parker |
| 5,713,705 A | 2/1998 | Grünbichler |
| 5,855,266 A | 1/1999 | Cummings, III |
| 5,937,979 A | 8/1999 | Cummings |
| 5,947,247 A * | 9/1999 | Cummings, III ......... F01P 7/04 192/112 |
| 6,865,809 B2 | 3/2005 | Vorbeck |
| 6,935,824 B2 | 8/2005 | Nowak, Jr. |
| 8,672,113 B2 | 3/2014 | Roby, Jr. |
| 8,807,313 B2 | 8/2014 | Roby |
| 2012/0048672 A1* | 3/2012 | Pickelman, Jr. et al. ................ F01P 7/042 192/85.61 |

* cited by examiner

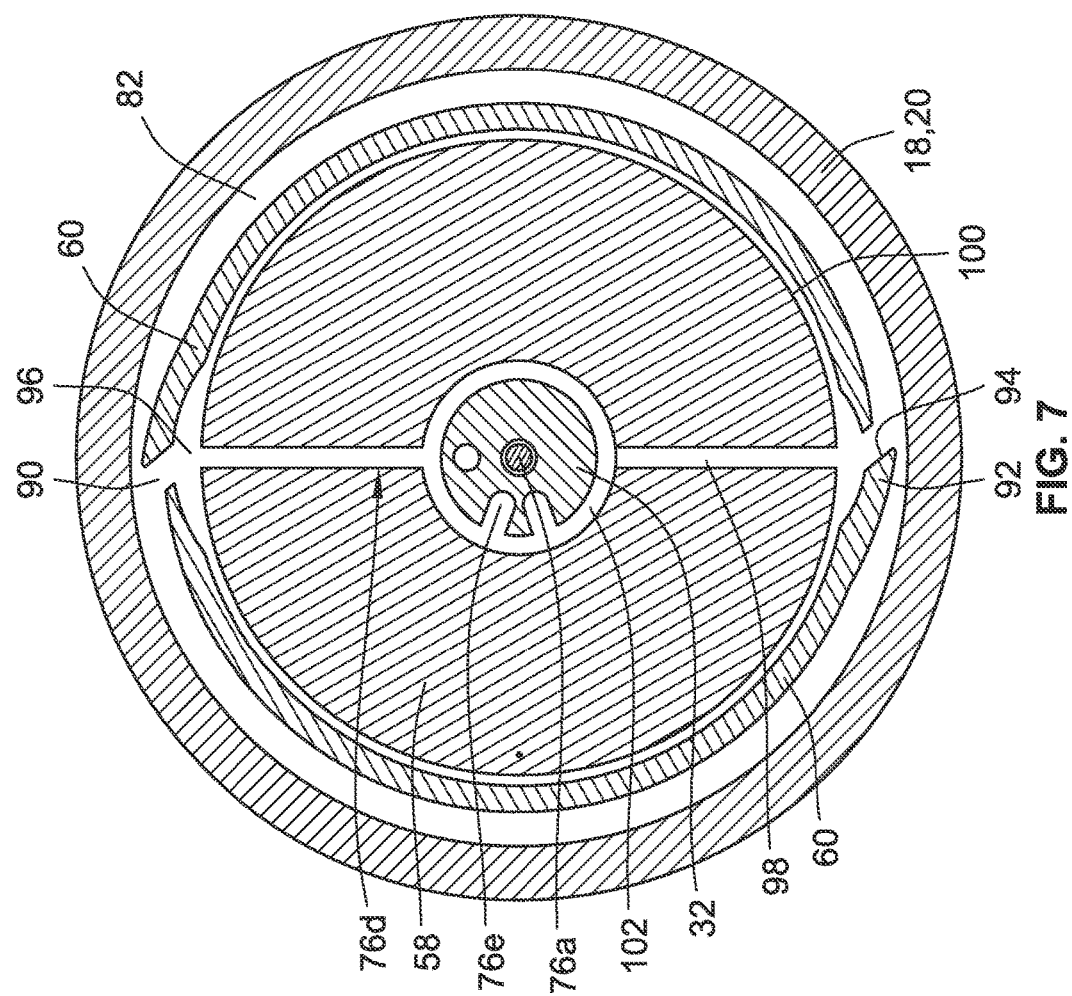

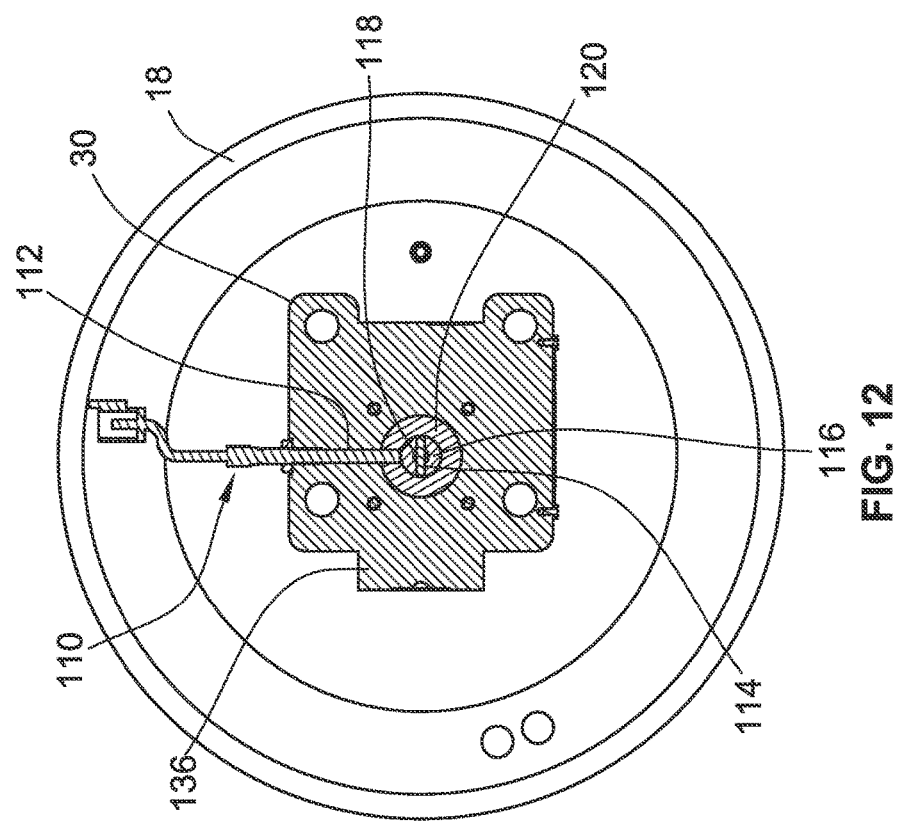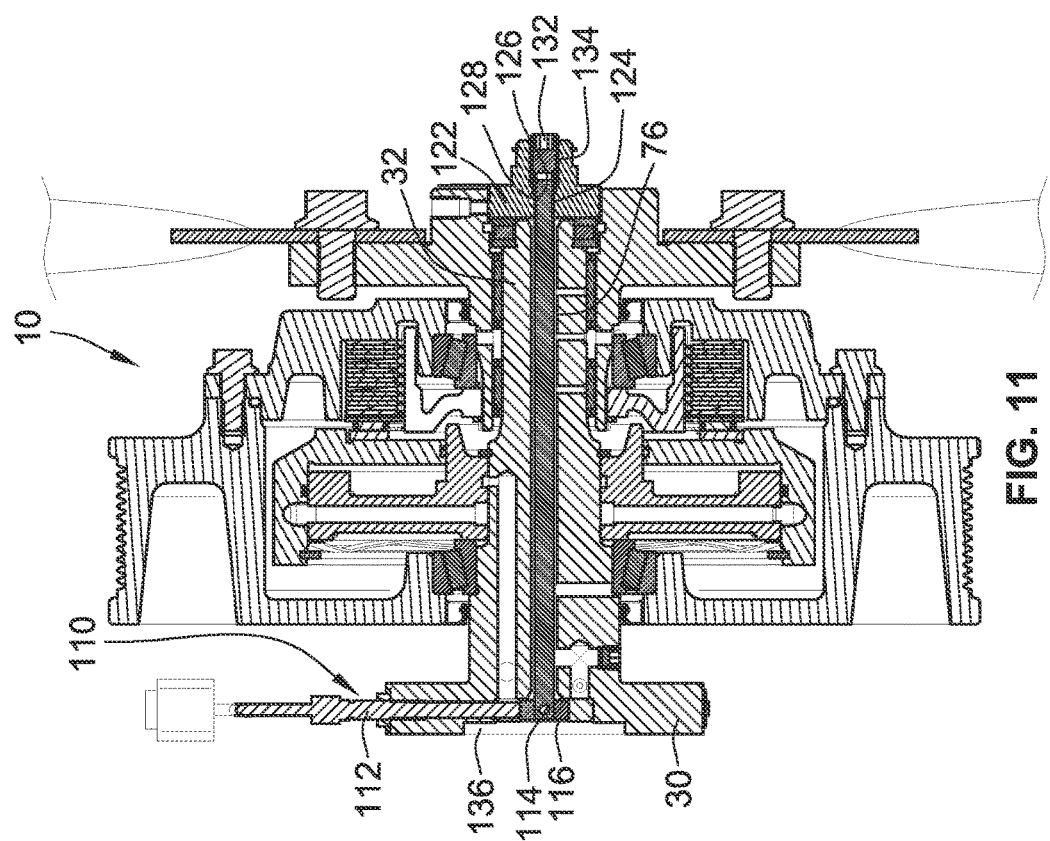

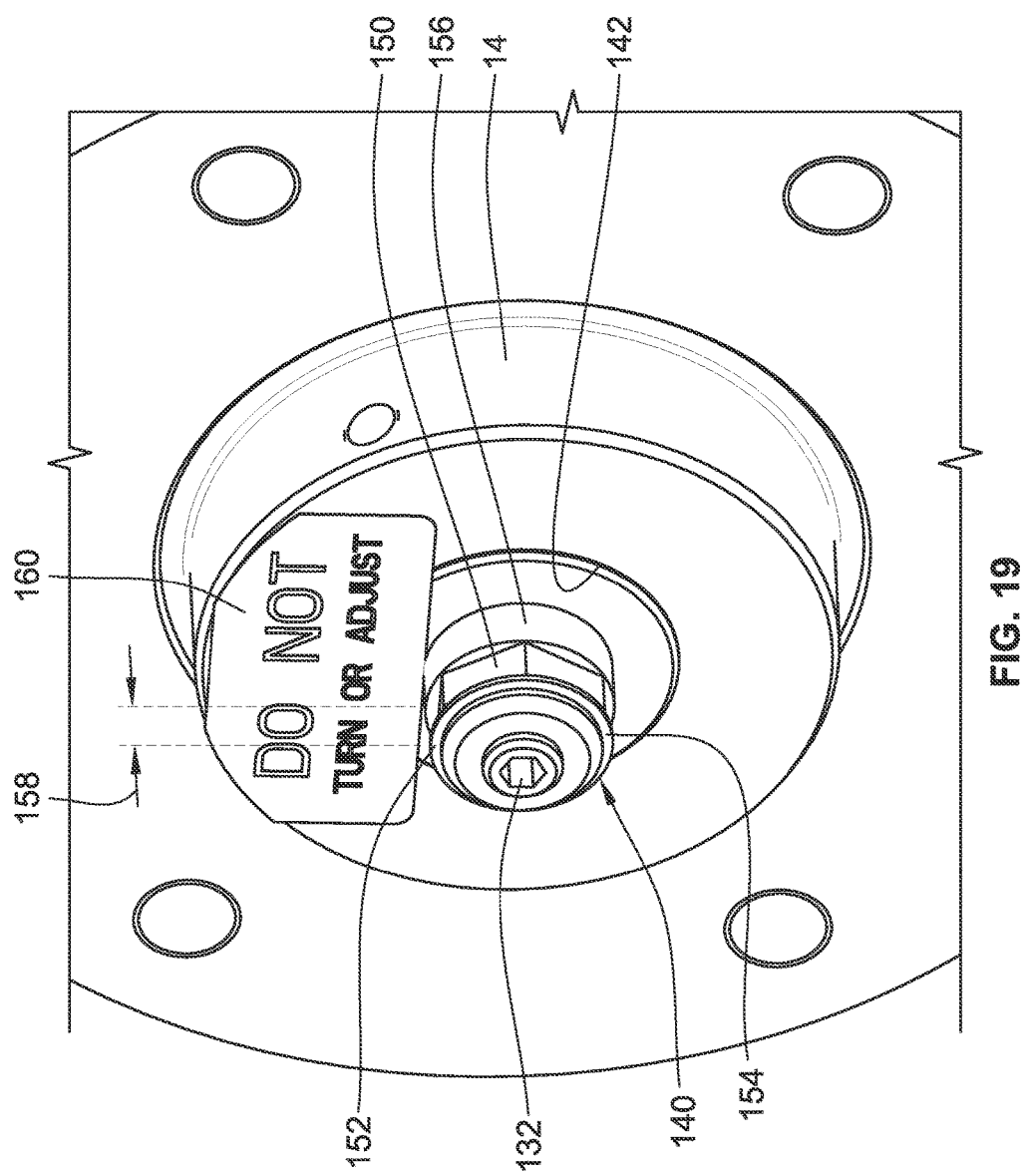

FAN CLUTCH

CROSS-REFERENCE TO RELATED PATENT APPLICATION

This patent application claims the benefit of U.S. Provisional Patent Application No. 62/060,358, filed Oct. 6, 2014, the entire teachings and disclosure of which are incorporated herein by reference thereto.

FIELD OF THE INVENTION

The present invention generally relates to clutch mechanisms and more particularly to clutch mechanisms which may be employed for a cooling fan of an engine and such clutch features relating to return of lubricating oil in clutches, anti-tamper devices on clutches, and/or rotational speed sensing systems in such clutch mechanisms.

BACKGROUND OF THE INVENTION

Clutch mechanisms for engines such as for cooling fans are well-known in the prior art. The state of the art for example may be exemplified by the following U.S. Pat. Nos. 3,804,219; 4,899,861; 8,672,113; 5,667,045; 5,855,266; 5,937,979; 5,560,462; 8,807,313; 6,865,809; 5,061,089; 6,935,824; 5,697,743; and 5,713,705. Some of the art mentioned above relates to clutch mechanisms, while other art listed above does not relate to this field and relates to other fields of endeavors. In either event, it is believed the art above is representative of the state of the art relative to various inventions and improvements discussed herein.

BRIEF SUMMARY OF THE INVENTION

One aspect of the present invention is directed toward clutch assembly for a cooling fan with an improvement relating to lubrication oil return. The clutch assembly includes a drive housing having a belt drive input; a drive body output for driving the cooling fan; and a clutch within the drive housing. The clutch has an engaged state in which the belt drive input rotationally drives the drive body output, and a disengaged state in which the belt drive input is rotationally disengaged with the drive body output. A piston assembly comprises a piston support body and a piston moveable relative to the piston support body with a working fluid chamber defined therebetween. The piston acts upon the clutch to transition the clutch between the engaged state and the disengaged state. A lubrication passage runs through the drive housing and into a lube collection region defined radially between the drive housing and the piston assembly. A collection passage extends radially through the piston with the collection passage having an inlet port exposed to the lube collection region.

It is a feature that the inlet port of a lube collection passage may be defined along an outer radial periphery of the piston.

It is a further feature that the outer radial periphery of the piston may include a step surface proximate the lube collection region. The step surface can providing a radially extending impact surface arranged to guide lube oil into the collection passage during rotation of the drive housing.

In an embodiment, the collection passage may include a first portion defined by the piston and a second portion defined by the piston support body. The first and second portions of the collection passage are in radial alignment and fluid communication.

In an embodiment, one of the piston and the piston support body can define a groove at an interface between the piston and the piston support. The groove can provide for continuous fluid communication through the collection passage at the interface.

Preferably in an embodiment, at least one of the piston and the piston support include an enlarged recess at the interface therebetween. The enlarged recess is sized large enough in an axial dimension to maintain continuous fluid communication the collection passage for an entire range of sliding movement between the piston and the piston support body.

In an embodiment, the clutch assembly may further comprise a stationary support shaft. The piston support body can be fixed in surrounding relation of the stationary support shaft with the stationary support shaft including a port communicating with a second portion of the lube collection passage running through the piston support body for returning lube oil collected from the collection region by the collection passage.

In an embodiment, an outer periphery of the piston may define a surface forming a scoop at the inlet port that tends to urge spinning lubricating oil into the collection passage.

Another aspect of the present invention is directed toward clutch assembly for a cooling fan with an improvement relating to speed sensing. The clutch assembly includes a drive housing having a belt drive input; a drive body output for driving the cooling fan; and a clutch within the drive housing. The clutch has an engaged state in which the belt drive input rotationally drives the drive body output, and a disengaged state in which the belt drive input is rotationally disengaged with the drive body output. A piston assembly comprises a piston support body and a piston moveable relative to the piston support body with a working fluid chamber defined therebetween. The piston acts upon the clutch to transition the clutch between the engaged state and the disengaged state. A sensor assembly comprises a transfer shaft having a first end portion coupled to the drive body output such that the shaft and the drive body output rotate in unison, and a second end portion carrying a sensor target. A sensor is arranged in sensory communication with the sensor target.

An embodiment may further include a stationary support shaft with the drive body output including a hub portion in surrounding relation of the stationary support shaft with bearings therebetween to facilitate rotation drive body output relative to the stationary support shaft.

In such an embodiment, the transfer shaft of the sensor assembly may extend through the stationary support shaft.

In an embodiment, a fan clutch assembly may comprise a screw body coupling the drive body output to the transfer shaft. The screw body may comprise a first threaded coupling with the drive body output and a second threaded coupling with the transfer shaft.

The fan clutch assembly may include tapered roller bearings supporting the drive housing for rotational movement relative to the stationary support shaft and the drive body output. The screw body can be set to axially load the tapered roller bearings to a predetermined load determined by an amount of threaded engagement at the first threaded coupling. The second thread coupling can be set to axially align the target and the sensor.

The sensor may comprise a magnet wheel affixed to the second end portion with the magnet wheel extending radially outward from the transfer shaft and having a magnet element.

A bushing can be secured to the stationary support shaft to support the magnet wheel for rotational movement at the second end portion.

In an embodiment, the transfer shaft can extend through the piston assembly and stationary support shaft.

Another aspect of the present invention is directed toward clutch assembly for a cooling fan with an improvement relating to anti-tamper mechanisms. The clutch assembly includes a drive housing having a belt drive input; a drive body output for driving the cooling fan; and a clutch within the drive housing. The clutch has an engaged state in which the belt drive input rotationally drives the drive body output, and a disengaged state in which the belt drive input is rotationally disengaged with the drive body output. A piston assembly comprises a piston support body and a piston moveable relative to the piston support body with a working fluid chamber defined therebetween. The piston acts upon the clutch to transition the clutch between the engaged state and the disengaged state. The clutch may also include a stationary support, and bearings supporting the drive body output for rotation relative to the stationary support. A screw body is secured to the drive body output via a first threaded coupling with the drive body output. The first threaded coupling controls load on at least one of the bearings. The screw body has a tool engaging surface. An anti-tamper device is positioned over the tool engaging surface and obstructs use of the tool engaging surface to prevent load modification of at least some of the bearings.

In an embodiment, the tool engaging surface can comprises a hex surface for engaging a wrench or socket. Further an annular groove an formed sufficient proximate the hex surface to prevent use of the hex surface with the anti-tamper device comprising an anti-tamper ring mounted in the annular groove.

In an embodiment, the anti-tamper ring may be a removable snap ring that enables access to the hex surface for serviceability.

In an embodiment, the hex surface comprises an uninterrupted axially extending length, the anti-tamper ring limiting the uninterrupted axially extending length to no more than ¼ inch to prevent interfacing with wrenches. The hex surface may be an external surface facing radially outward having a width of at least about ½ inch for engagement with a ½ inch wrench or socket when anti-tamper ring is removed for service.

In an embodiment, the anti-tamper ring is arranged at a front region of the hex surface to prevent operative engagement with a socket wrench.

The fan clutch assembly may also comprise a stationary support shaft with the drive body output including a hub portion in surrounding relation of the stationary support shaft with bearings therebetween to facilitate rotation drive body output relative to the stationary support shaft. The bearings may include tapered roller bearings supporting the drive housing for rotational movement relative to the stationary support shaft and the drive body output with the screw body being set to axially load the tapered roller bearings to a predetermined load determined by an amount of threaded engagement at the first threaded coupling.

Another inventive aspect is directed toward a method of assembly a clutch assembly. The method comprises: setting a first threaded coupling at a selected load to pre-load at least one set of bearings that facilitate relative rotation between the drive body output and the drive body housing or a stationary support therefore; and thereafter setting a second thread coupling linearly translate a transfer shaft to axially align a sensor in sensory communication with a sensor target.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 7 is a cross-section or different view of the assembly shown in FIG. 5 to better show the cross-sectioned face;

FIG. 11 is an isometric and cross-sectional view of the fan clutch assembly according to an embodiment similar to that shown in FIGS. 1 and 3 with the primary difference being size; and with the features, components and operation being similar and equally applicable among the various described embodiments, such that like numbers are used in the various drawings and it is understood that features and written description described for the embodiment of FIG. 11 are applicable to the embodiments of FIGS. 1 and 3, and vice versa;

FIG. 12 is an end view of the fan clutch assembly shown in FIG. 11;

FIG. 19 is a front isometric view of the fan clutch assembly shown in the various embodiments to better illustrate the principal of the anti-tampered device and position of the lead screw body.

Figure 1:
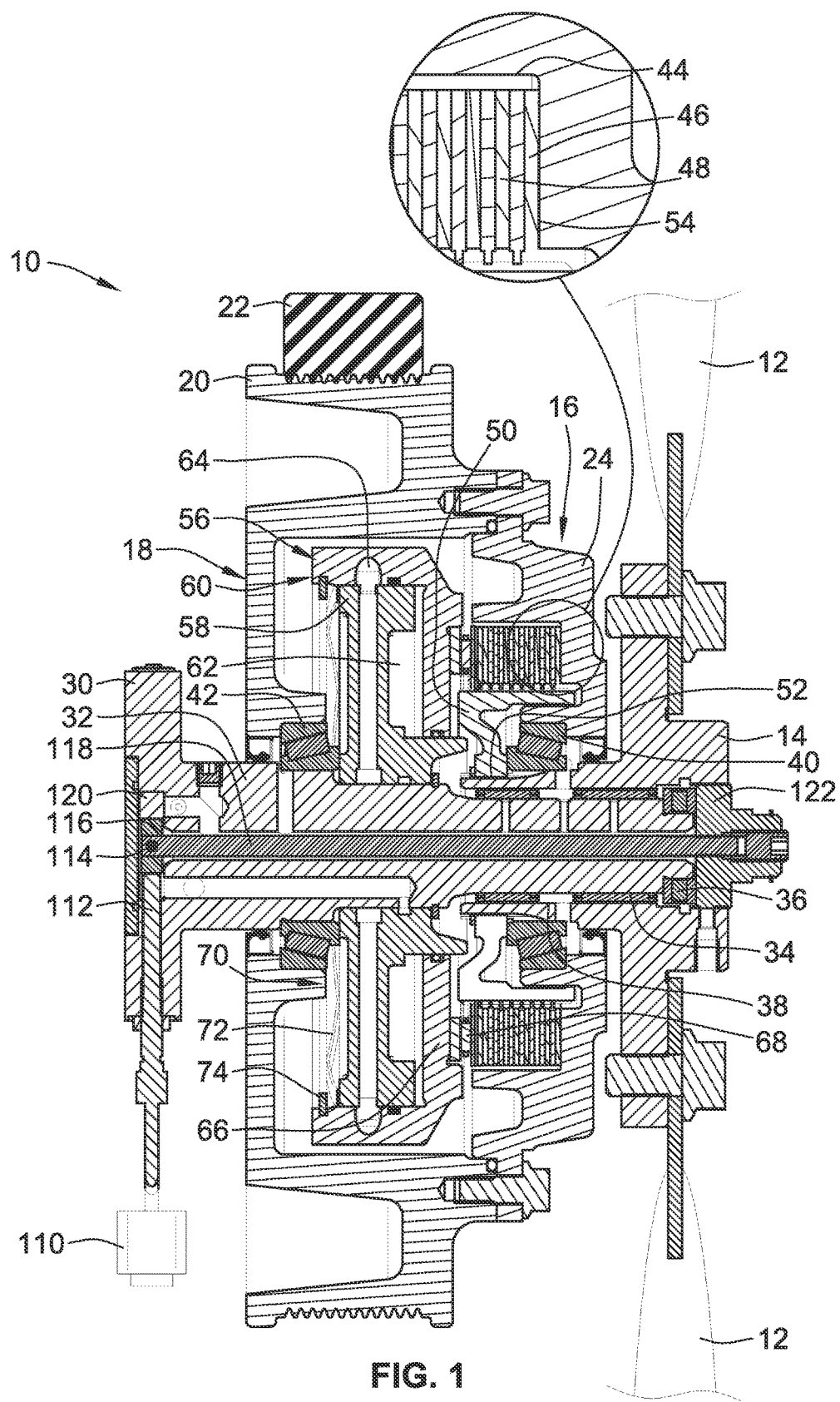
FIG. 1 is a cross-section of a fan clutch assembly in accordance with an embodiment of the present invention.
Figure 2:
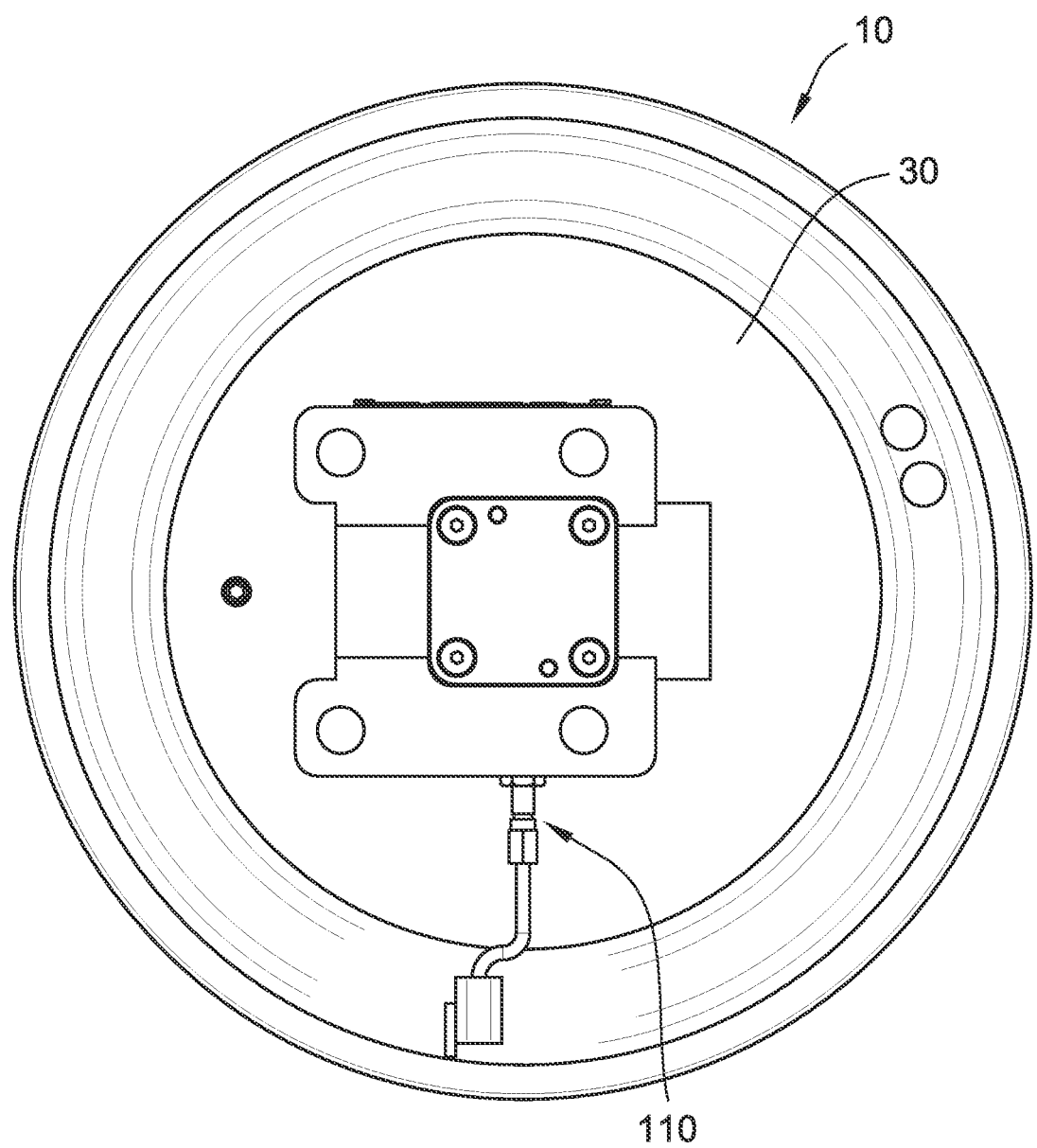
FIG. 2 is an end view of the fan clutch assembly shown in FIG. 1.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring now to the drawings, wherein like references indicate like parts throughout the several views, in FIGS. 1-19 show embodiments of the present invention as a fan clutch assembly 10 that can be mounted on a prime mover or internal combustion engine. The fan clutch assembly 10 is typically used in large vehicle engine applications and with a conventional radiator that is capable of supplying cooling for over-the-road vehicles and other large engines.

Referring to FIG. 1, a schematically illustrated fan 12 is shown connected to a drive body output that may take the form of a fan hub 14 which in turn is driven by a clutch mechanism generally indicated at 16, which itself is driven by a drive housing 18. The drive housing 18 includes a sheave or belt drive housing 20 that engages an engine belt 22; and also a drive plate retainer housing 24 that holds driving clutch plates that form part of the clutch mechanism as described herein. The clutch mechanism 16 couples the power transmitted by the engine drive belt 22 when engaged from the engine to the fan 12 to facilitate a cooling air flow.

The fan clutch assembly 10 may have a continuously variable output speed that is controlled by an electrical signal responsive to cooling needs so that the fan 12 can rotate at a speed needed by the engine for adequate cooling. In some cases, the fan 12 may be declutched or have a disengaged state in which the belt drive input or belt drive housing 20 is disengaged through the clutch mechanism with the fan hub 14, such that the fan 12 does not move or moves minimally. Also, there is an engaged state in which the clutch mechanism 16 couples the drive housing 18 (either fully or partially in a continuously variable mode) to rotationally drive the fan hub 14 and thereby fan 12.

The fan clutch assembly includes a mounting bracket 30 which can be securely fixed to an engine. The mounting bracket 30 acts thereby as a stationary support that includes an extending stationary support shaft 32 extending toward and into the fan hub 14 in an embodiment. The stationary support shaft 32 supports roller bearings 34 and thrust bearings 36 that act as an interface between the stationary support shaft 32 and the fan hub 14 to facilitate relative rotation therebetween. As a result, the fan hub 14 can rotate readily relative to the stationary support shaft 32 via the bearings 34, 36. These bearings act on a hollow shaft or hub portion 38 of the fan hub 14 which extends around and encircles the stationary support shaft 32.

Additionally, to facilitate relative rotation between other components, sets of tapered roller bearings 40, 42 are provided. A first set of tapered roller bearings 40 are disposed between the hub portion 38 of the fan hub along the inside and the driven retainer housing 24 (and therefore drive housing 18) along the outside to facilitate relative rotation between these components. The second set of tapered roller bearings 42 are disposed on the inside between the support shaft 32 along the inside and the belt drive housing 20 (and thereby overall drive housing 18) along the outside to facilitate relative rotation between these two components. As a consequence, the drive housing 18 can freely rotate relative to the fan hub 14 which can freely rotate relative to the stationary support shaft 32 and therefore the overall stationary support structure.

Referring to the clutch mechanism 16, it will be seen that the drive retainer housing 24 includes an annular flange 44 which carries a plurality of driving clutch plates 46. The driving clutch plates 46 are axially slideable along splines on the annular flange 44 so that they are rotated along with the drive housing 18. A plurality of driven clutch plates 48 are interleaved and interposed with the driving clutch plates 46. The driven clutch plates 48 are carried by an internal clutch hub 50 and are axially slideable on splines on the hub 50 such that the driven clutch plates 48 may slide axially relative to each other to either engage or release with the driving clutch plates 46. The clutch hub 50 also has an internal spline 52 which matingly engages corresponding spline at the same location on the drive fan hub 14 to form a spline connection for driving the fan hub 14 in response to movement of the drive housing 18 when the clutch is in an engaged state. At the internal spline 52, the internal clutch hub 50 may slide axially relative to the fan hub but movement in an axial direction is limited by a stop, such as may be provided by snap retainer ring 148 (e.g. see FIG. 15).

The clutch plates 46, 48 are axially interposed between an operating face 54 of the drive housing 18 along one end, and a piston assembly 56 along the other end. The piston assembly 56 includes a plate 66 arranged to apply pressure to the clutch plates in response to cooling needs.

The pistons assembly 56 generally includes a piston support body 58 that is fixed and may be press-fit onto a support shaft 32; and a moveable piston 60 that can slide axially relative to piston support body 58. In this embodiment, moveable piston 60 includes an annular outer portion 64 that surrounds and slides along the corresponding outer surface of the piston support body 58 and a piston plate 66 that extends over the front of the piston support body 58 and defines therebetween a working fluid chamber 62.

The working fluid chamber 62 can be pre-pressurized or depressurized with a suitable working fluid such as oil or alternatively air in another embodiment to facilitate movement and application of the moveable piston 60 toward the clutch plates 46, 48. The piston plate 66 may operate through a thrust bearing 68 to the clutch package comprising the various clutch plates 46, 48. Thus, pressurization of the working fluid chamber 62 operates to squeeze and thereby engage the clutch plate 46, 48 in an engaged state to facilitate coupling of the fan hub and drive housing 18. Additionally, a spring mechanism 70 is provided to disengage and depressurize working fluid chamber 62 to facilitate the disengaged state and thereby decouple fan hub 14 and drive housing 18.

The spring mechanism 70 may include a wave spring 72 disposed along a backside of the piston support body 58 that acts upon a snapper ring 74 that is coupled to the moveable piston 60.

Figure 3:
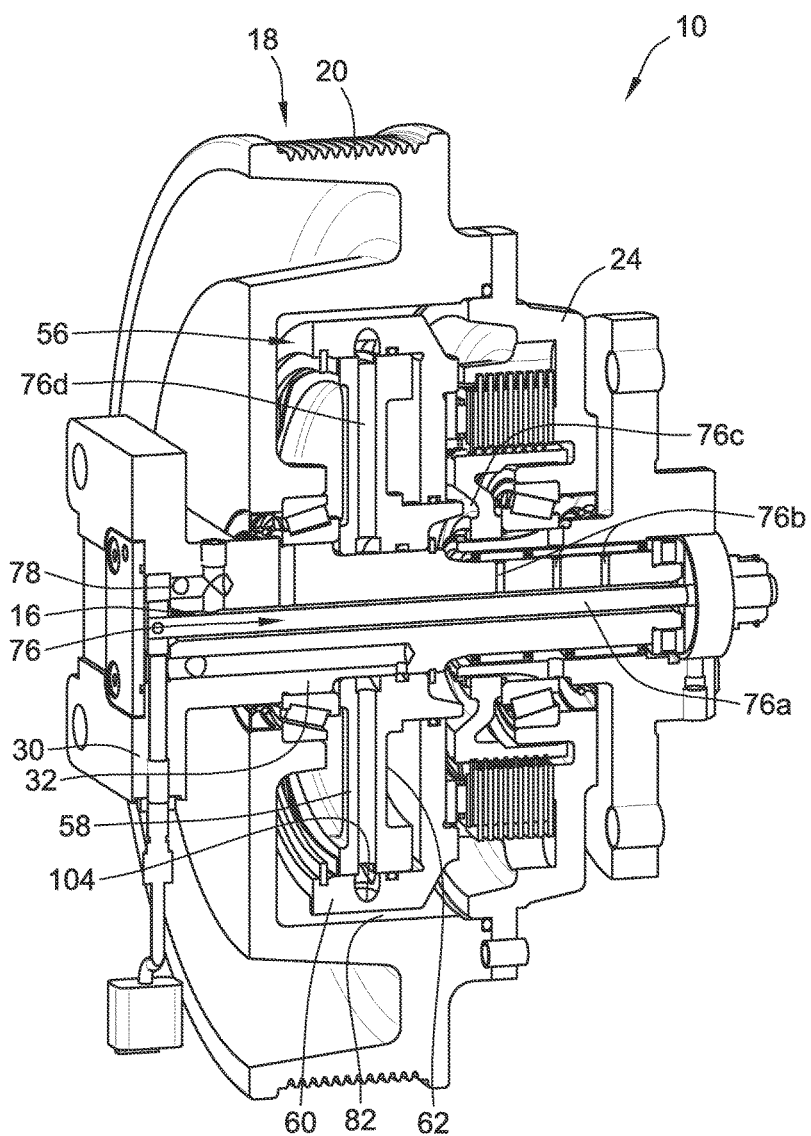
FIG. 3 is an isometric and cross-sectional view of the fan clutch assembly according to an embodiment similar to that shown in FIG. 1 with the primary difference being size: and with the features, components and operation being similar and equally applicable among the various described embodiments such that like numbers are used in the various drawings and it is understood that the features and written description described for the embodiment of FIG. 1 are applicable to the embodiment of FIG. 3, and vice versa.
Figure 4:
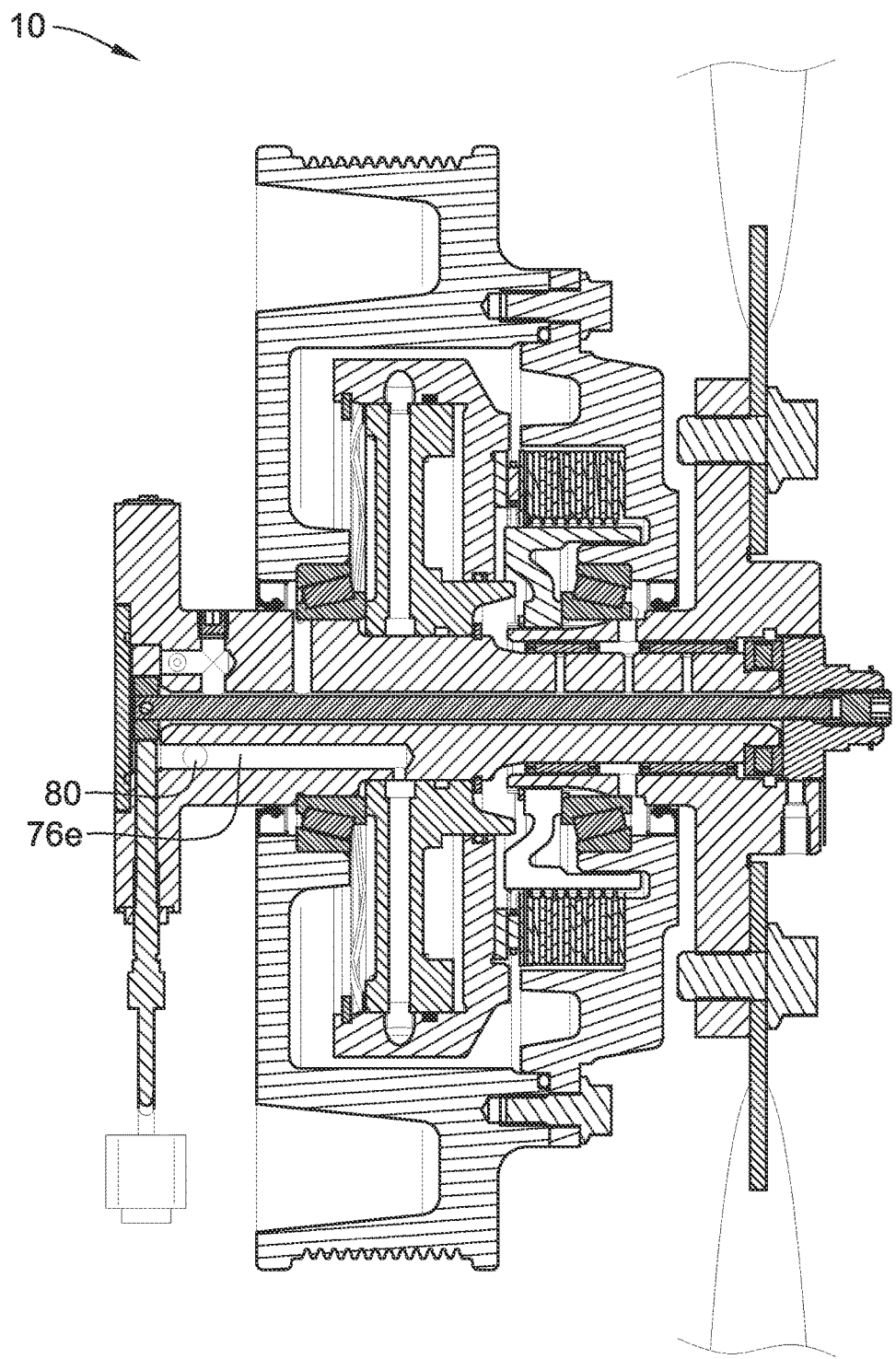
FIG. 4 is another cross-sectional view of the fan clutch assembly shown in FIG. 3.
Figure 6:
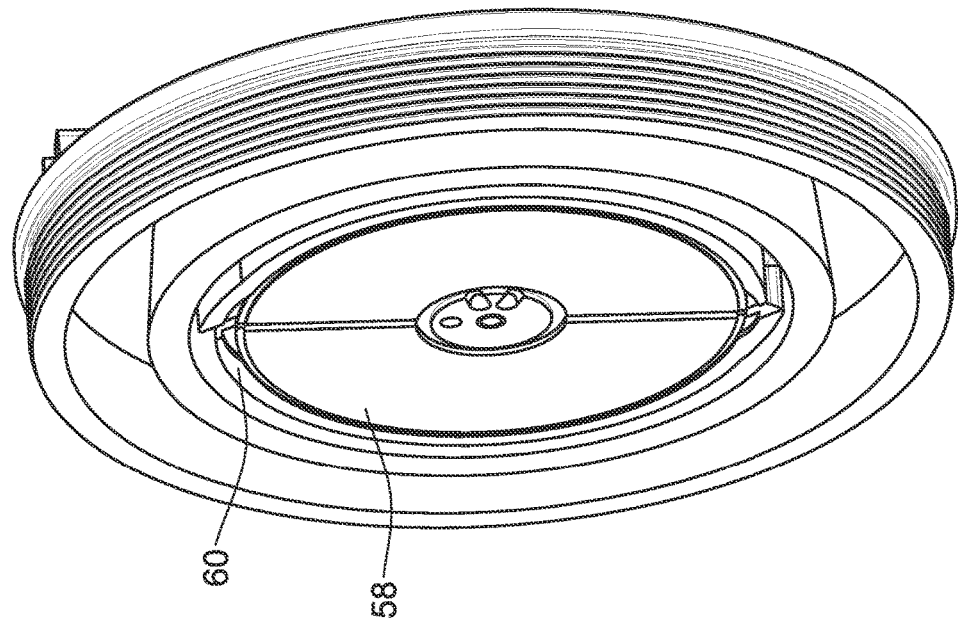
FIG. 6 is another isometric view similar to that of FIG. 3, but taken from a different angle.
Figure 5:
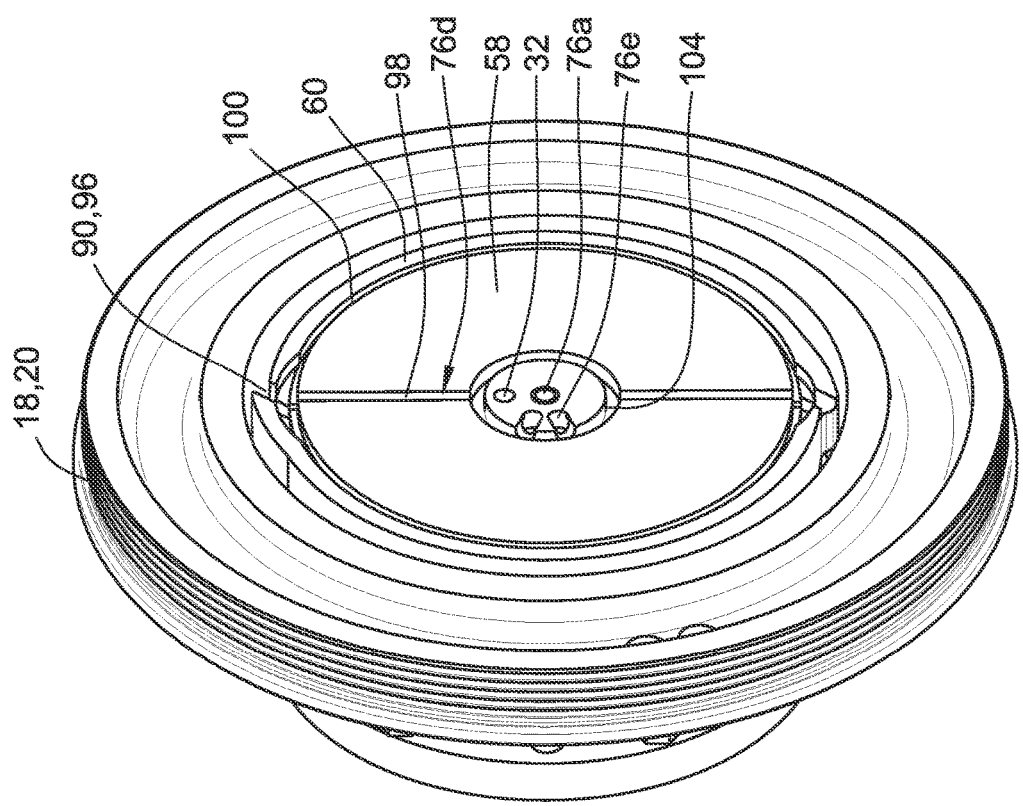
FIG. 5 is an isometric and cross-section of certain components of the fan clutch assembly shown in FIG. 3 to include the components of the piston assembly, stationary support shaft, and belt drive input of the drive housing.
Figure 8:
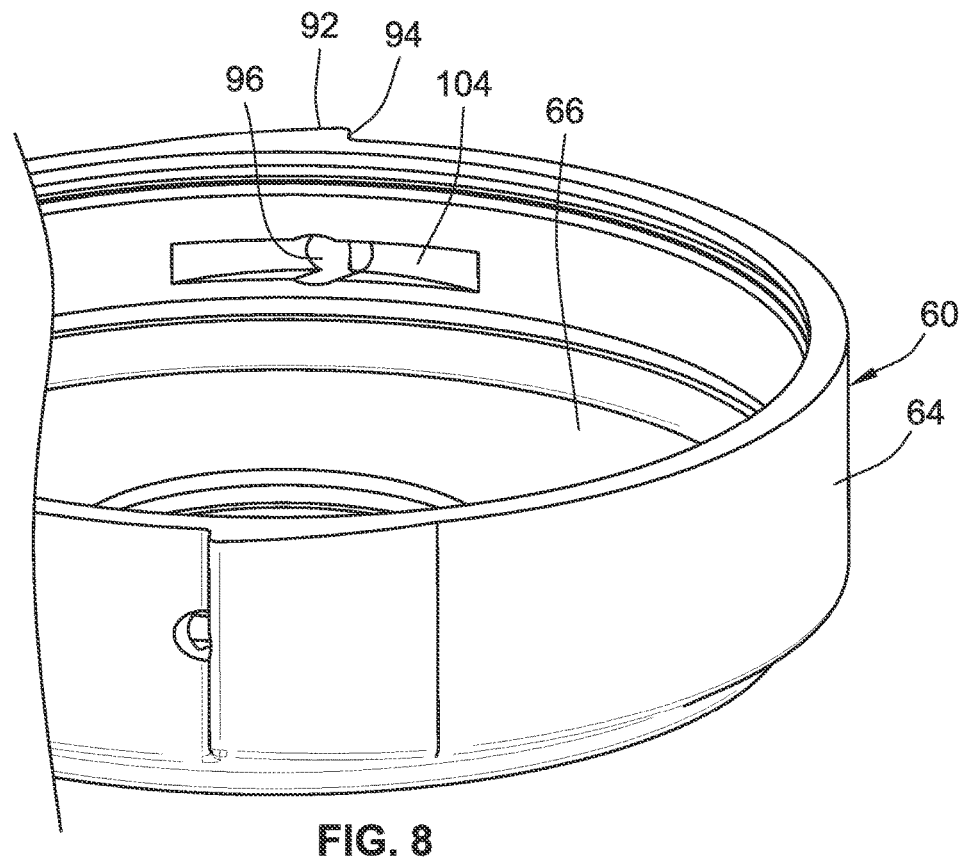
FIGS. 8 and 9 are different isometric views of part of the movable piston of the piston assembly to better show the collection passage inlet port to the collection passage and scoop portion of such movable piston that is useable in the embodiments of FIGS. 1 and 3.
Figure 9:
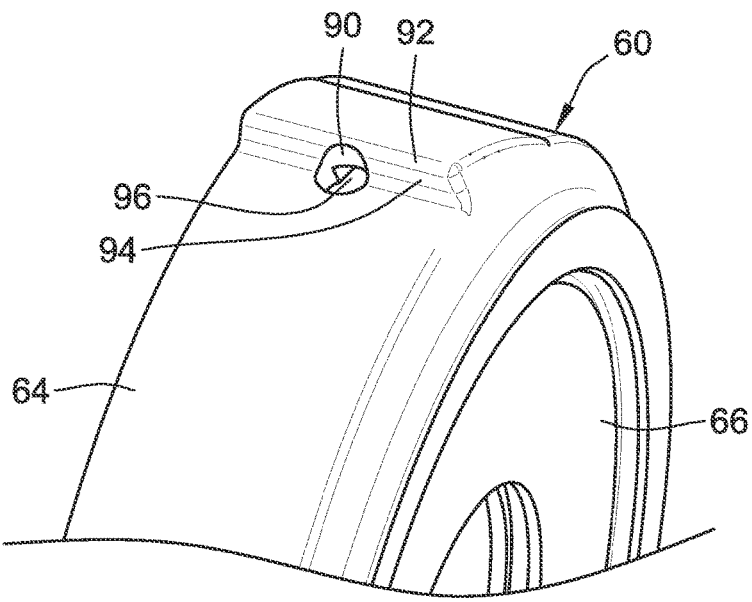
Figure 10:
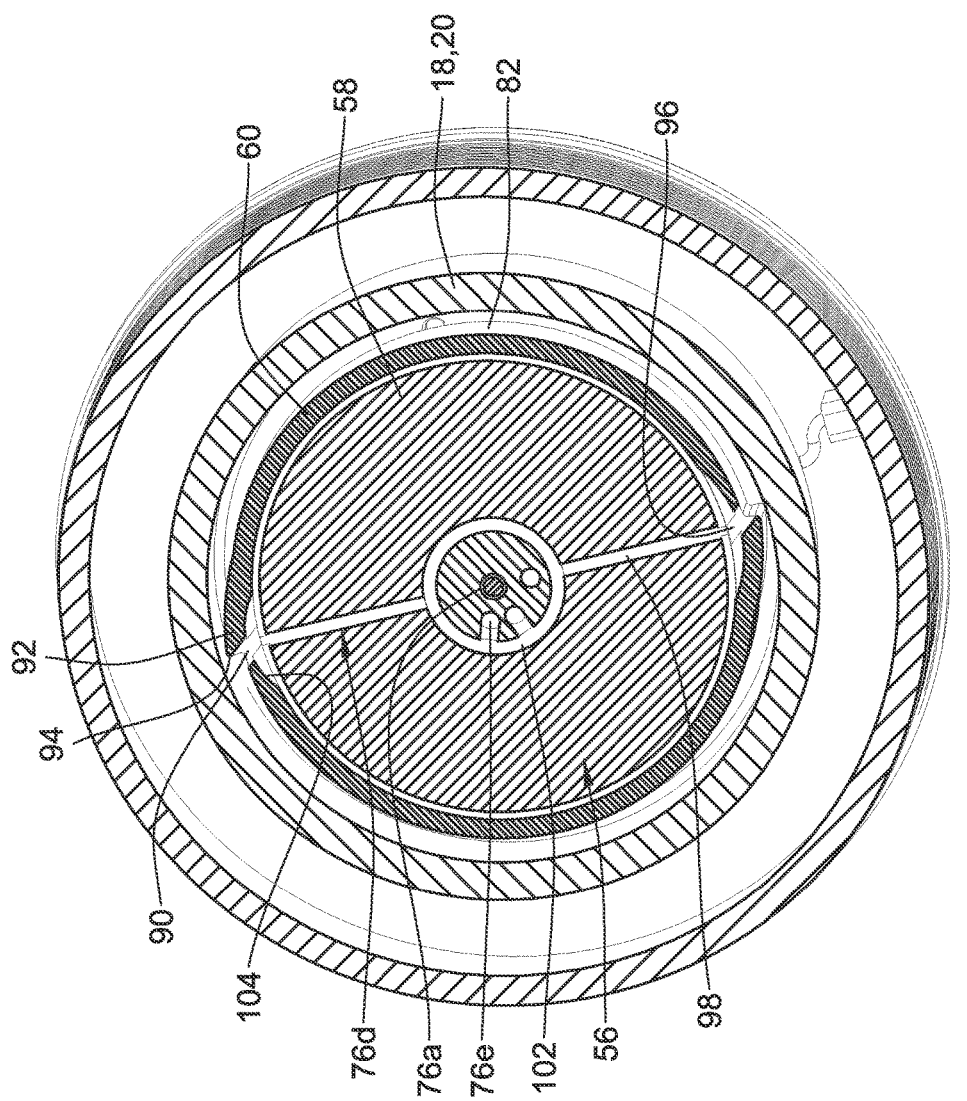
FIG. 10 is an enlarged view of the assembly similar to FIG. 7 to better illustrate the passages depicted, but for an embodiment with a larger sheave such as shown in FIG. 1.
Figure 13:
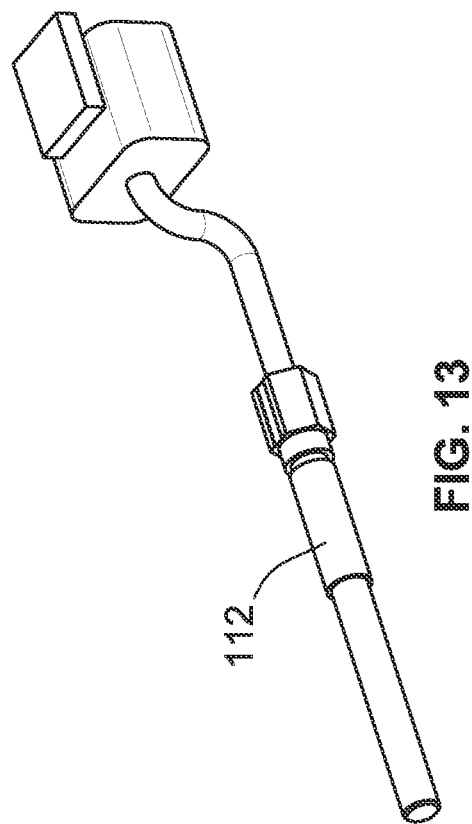
FIG. 13 is an isometric view of the Hall Effect sensor employed in the fan clutch assembly of the various embodiments.
Figure 14:
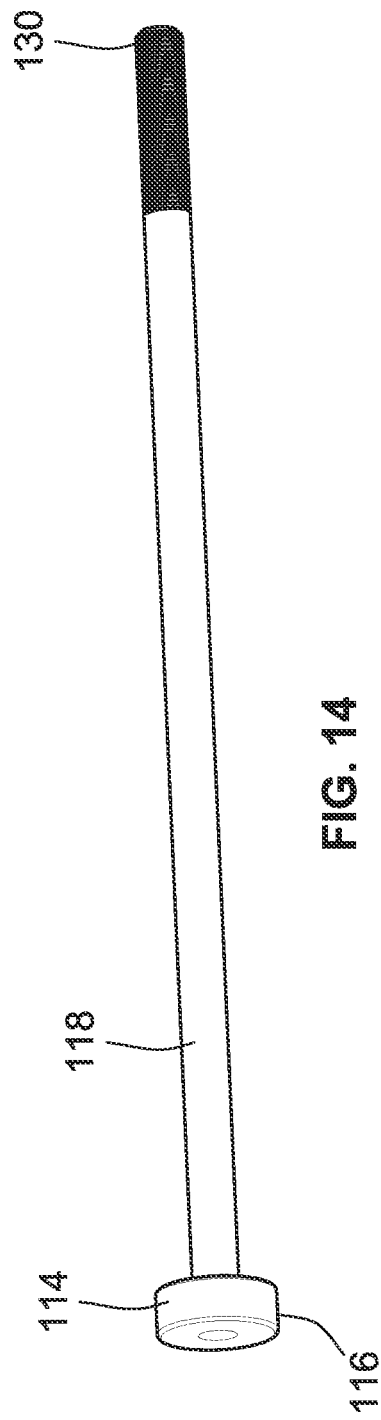
FIG. 14 is an isometric view of the magnet wheel and transfer shaft assembly employed in the fan clutch assembly of the various embodiments.
Figure 15:
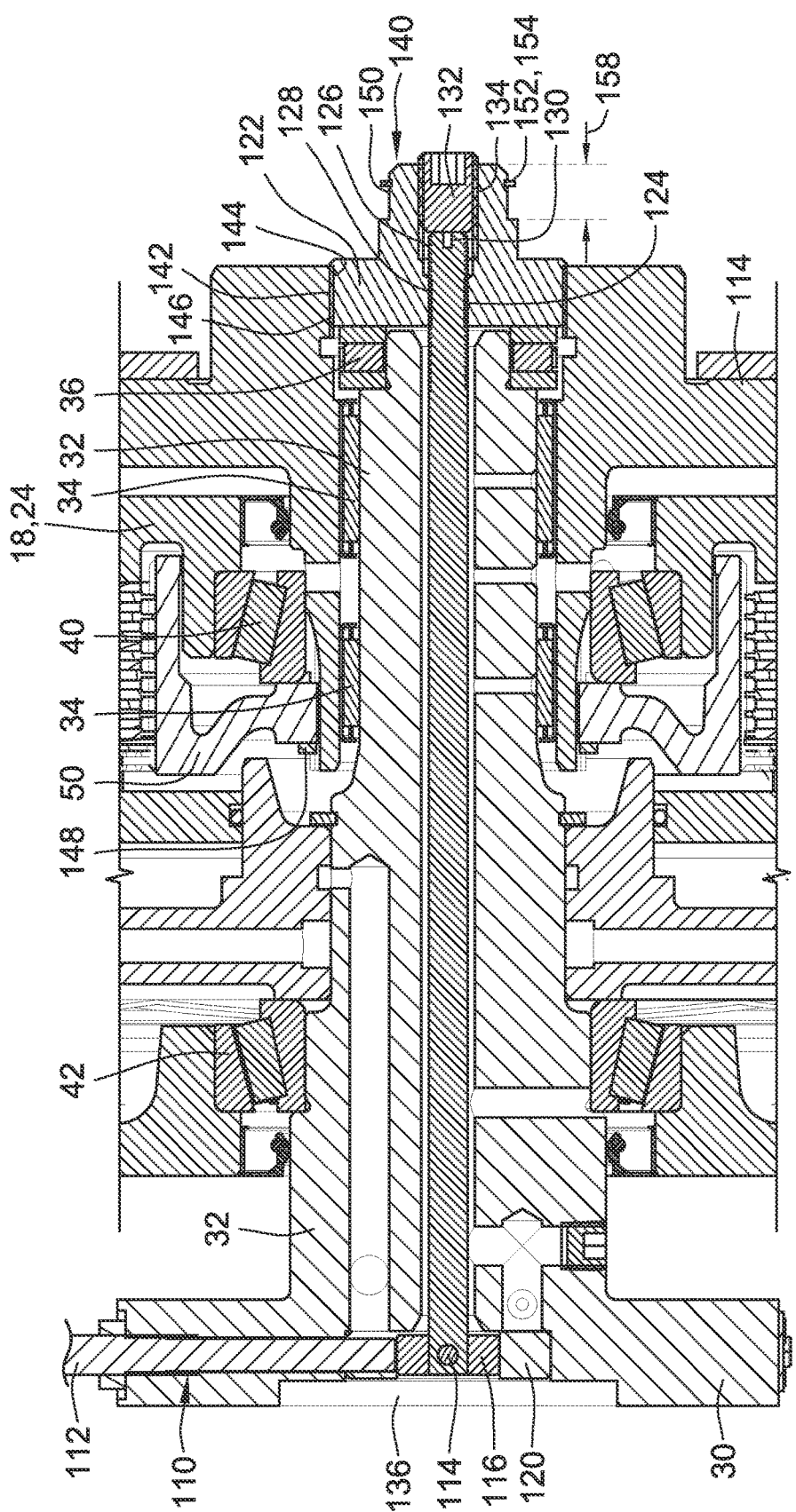
FIG. 15 is an enlarged cross-sectional view of a central region of the fan clutch assembly shown in FIG. 11, to better show the transferred shaft magnet wheel and lead screw body.
Figure 16:
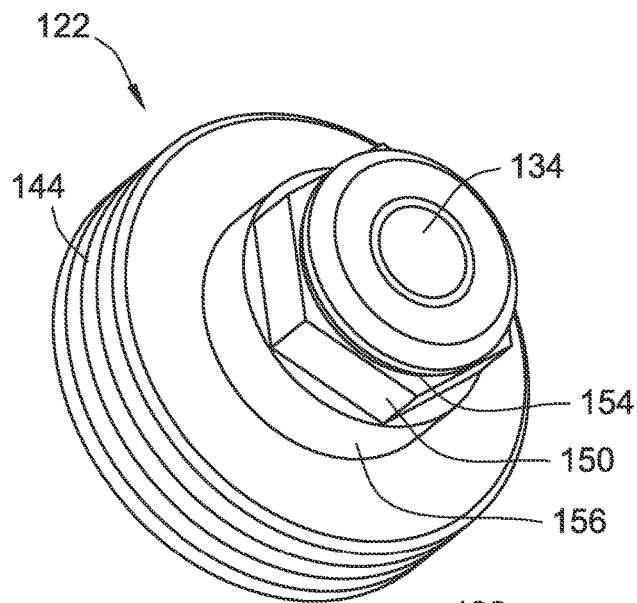
FIG. 16 is an isometric view of a lead screw body employed in the fan clutch assembly of the various embodiments.
Figure 17:
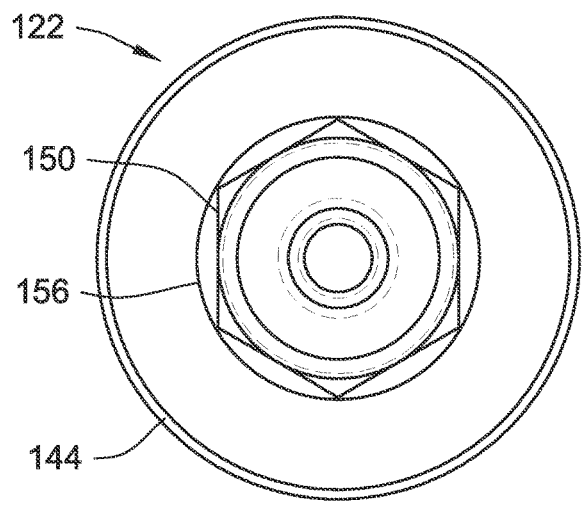
FIG. 17 is a frontal view of the lead screw shown in FIG. 16.
Figure 18:
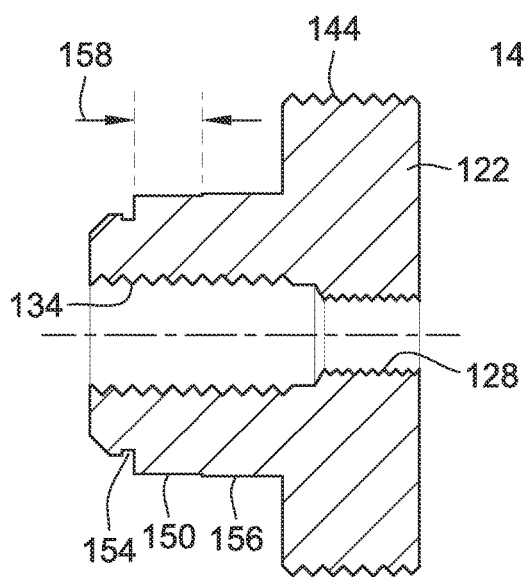
FIG. 18 is a cross-section of the lead screw body shown in FIG. 16.

Turning now to FIGS. 3-10, and particularly FIGS. 3-4, it can be seen that there is a continuous lubrication passage 76 running through the entire fan clutch assembly 10. The lubrication passage 76 enters at inlet port 78 defined by the stationary support and may include an axially extending passage 76A directing lube oil into the stationary support shaft 32 and radial passages 76B directing lube oil radially outward to lubricate moving surfaces and bearings. At this location, the lubrication passage 76 is formed with a portion 76C extending through the drive housing with the open regions defined generally within the drive housing 18 where lubrication oil is directed through the various clutch plates 46, 48 facilitate cooling thereof. The pressurized oil continues along the path where it eventually is collected in a lube collection region 82 which is an annular region formed along the inner wall of the drive housing 18 generally in the area indicated at 82. At this location it can be understood that the belt drive housing 20 in operation is rotating such that it tends to impart spin or centrifugally moves the oil in an annular path along the inside surface of the drive housing 18. The lubrication passage 76 then has a portion that extends through the piston assembly at 76D which joins up with a shaft return passage portion 76E that leads to the outlet port 80 in the stationary support structure. In this way, lubrication passage 76 is continuous from the inlet port 78 shown in FIG. 3 to the outlet port 80 shown in FIG. 4.

It can thus be seen that the lubrication passage 76 is continuous in viewing FIGS. 3 and 4 which are cross-sections taken through different portions of the fan clutch assembly to show the incoming fluid passage connected to inlet port 78 and the outgoing passage connected to outlet port 80.

In accordance with certain inventive aspects, the embodiments include a portion of the lubrication passage that runs through the piston assembly 56, to include at least the moveable piston 60 as shown generally by lubrication passage portion 76D. However it can be seen that lubrication passage portion 76D may be provided by multiple structural details which will now be discussed with additional references to FIGS. 5-10.

To facilitate oil flow into lubrication passage portion 76D, the moveable piston 60 includes an inlet port 90 at its outer peripheral surface to collect the oil which is spinning during operation in lube collection region 82. As can be seen, the inlet port 90 and corresponding radial passages through the piston assembly may be provided in two or more sets such as two sets being shown in the drawings but for purposes of description only one such set of passages and structures will be described understanding that a second identical structure is provided 180 degrees apart. (See FIG. 7 for example).

To facilitate flow into the inlet port 90, the moveable piston 60 along its outer surface may form one or more scoops 92 that are directed and arranged to engage with the spinning oil along the lube collection region 92 to cause impact along scoop surface 94 which directs lubrication oil into the inlet port 90. The scoop 92 may be formed by a stepped surface in the outer periphery as illustrated.

The piston 60 has a piston passage 96 to facilitate oil flow through the moveable piston 60 to join up with a remainder of the lubrication passage 76 which may include a piston support body passage 98 formed in the piston support body 58. Piston support body passage 98 as illustrated extends radially inward from the piston passage 96 and communicates the lubricating oil from the piston radially inward to the shaft. At the interface between the moveable piston 60 and the piston support body 58 is provided an outer annual collection groove 100 that is defined either along the inner periphery of the piston or the outer periphery of the piston support body 58 as illustrated. This ensures continuous communication of lubrication oil through the piston assembly 56.

The piston support body passage 98 then directs the lubricating oil radially inward where another annular groove 102 is provided this being an inner groove defined at an interface between the stationary support shaft 32 and the piston support body 58. The annular groove 102 again may be defined by either one but in this case it is defined by the piston support body 58 as illustrated. The inner annular groove 102 ensures continuous communication with the shaft return passage portion 76E which includes a radial port oriented at a predetermined angular orientation. Thus with the inner annular groove 102 extending all the way around, continuous fluid communication is ensured.

As can be seen in FIGS. 4-10, the collection passage at the interface between the moveable piston 60 and the piston support body 58 provides for continuous fluid communication at that location even though the moveable piston has some limited range of axial movement relative to the piston support body. Preferably, at least one of the piston and the piston support include an enlarged recess 104 (see e.g. FIG. 8) that has an axial length or dimension that is larger than the axial dimension of the piston support body passage 98 (e.g. outer annular groove 100) and is large enough to maintain continuous fluid communication in the collection passage for an entire range of sliding movement between the piston and the piston support body.

In an embodiment, an enlarged recess 104 is shown to be formed along the inner peripheral region of the moveable piston and forms part of piston passage 96.

As now apparent, a complete lubrication return passage is formed through the piston assembly 56 through the one or more inlet ports 90 and through the one or more corresponding piston passages 96 and piston support body passages 98 where it joins up with and meets with shaft return lubrication passage portion 76D.

As a consequence of the lubrication return passage running through the piston 60, the overall axial length of the fan clutch assembly 10 can be reduced in size due to the fact that a pitot tube outside of the piston assembly which typically rides or is located behind the piston assembly need not be provided to facilitate return of oil flow. This can result in a significant size savings which is quite valuable for engine builders in saving space under the hood in such land moving vehicles, or stationary industrial equipment.

It is also noted that the lubrication return passage is not in communication with the working fluid chamber 62 in an embodiment. Seals prevent ready communication and seal off the working fluid chamber 62 other than transient leakage that can occur. A separate control fluid passage separately feeds and vents working fluid to the working fluid chamber 62.

Turning then to other inventive aspects, referring back to FIG. 1 and with additional reference to FIGS. 11-15, a unique sensor assembly 110 may also provide. Sensor assembly 110 provides an output indicating the rotational speed of the fan hub 14 (and therefore fan 12) to provide an indication of the amount of cooling being provided. This may be used for various control or other feedback purposes or for general information to the operator.

Sensor assembly 110 comprises a suitable sensor and sensor target. In this embodiment, the sensor may comprise a Hall Effect speed sensor 112 with a probe extending perpendicular to the central axis and that is mounted into the mounting bracket 30 that is in the sensory communication with an appropriate sensor target such as a magnet 114.

As can be seen, the Hall Effect speed sensor 112 is arranged on a backside of the overall clutch assembly and behind the drive housing 18 with the fan hub 14 being located at the opposite front end of the clutch assembly 10. As such, the location of the rotational output is not the same at where the sensing is occurring.

To facilitate transfer of the rotational movement for sensing, a transfer shaft 118 carrying the rotational movement from the front end to the back end may be provided. The transfer shaft carries the magnet 114 along the back end.

For alignment and spacing, a magnet wheel 116 may carry the magnet 114 which rides in a bushing 120. The bushing 120 is mounted in a circular recess in mounting bracket 30 and covered by cover plate 136.

Cover plate 136 can be secured to the mounting bracket 30 once the position of the transfer shaft 118 and magnet are set as described below.

The magnet wheel 116 and magnet 114 are secured to the transfer shaft 118 with the magnet extending not only through the magnet wheel but also transfer shaft 118. The magnet 114 may be a pin extending perpendicular to the central axis with north and south poles on opposite sides thereof The transfer shaft extends longitudinally along the axis to connect the magnet wheel 116 and magnet 114 to the fan hub via a screw body 122. The transfer shaft may also extend through the incoming lubrication passage shaft portion 76A with a clearance or a gap between the transfer shaft 118 and the inside hollow passage of the stationary support shaft 32 to facilitate lubrication flow between the transfer shaft 118 and the stationary support shaft 32.

To ensure axial alignment of the magnet wheel 116 and magnet 114 in the proper position relative to the Hall Effect speed sensor 112, the transfer shaft 118 includes a threaded interface 124 with the screw body 112 with corresponding threads 126, 128 on the shaft 118 and screw body 122 respectively. The transfer shaft 118 can be adjusted with a screwdriver by means of screwdriver socket 130 that is formed into the forward end of the transfer shaft 118 proximate to where the thread 126 of the shaft is located (the socket may also be at the other end of the transfer shaft).

The transfer shaft 118 and therefore location of magnet 114 can be set after the entire fan clutch assembly is assembled to thereby provide for the fine tuning or accurate and precise location of the magnet regardless of any tolerance stack up or other misalignment issues. Thus, setting the transfer shaft location 118 can be done at the back end of the assembly of the fan clutch assembly 10 to provide for the correct location of the magnet and magnet wheel at the back end of the fan clutch assembly.

To prevent tampering or hinder easy access to a screwdriver socket 130, a set screw 132 may be screwed into a central opening 134 that is defined in the screw body 132 that otherwise would allow for access and tool engagement with the transfer shaft 118. Further set screw 132 is in tight contact with transfer shaft 118 to lock the adjustment location of magnet wheel 114, A further inventive aspect of the present embodiments is directed toward an anti-tamper device generally indicated at 140 that limits tool access to the screw body 122. This prevents unwanted tampering with the screw body 122. Tampering could adversely affect the external applied load reactions (from belt & fan) as transferred on various bearings contained within the overall fan collection assembly 10.

In accordance with this feature, the screw body 122 includes a second threaded interface 142 that engages with the fan hub 14. Specifically, the second threaded interface 142 include a first thread 144 on an outer peripheral surface of the screw body 122 and a second thread 146 on an inner surface of the fan hub 14 which are engaged with each other. As a result, rotational translation or torqueing of the screw body 122 will result in linear axial translation movement of the fan hub 14.

The movement of the fan hub 14 affects the bearings. It can be seen for example in FIG. 15 that the screw body 122 is situated at the end of the stationary support shaft 32 with the thrust bearing 36 facilitating relative rotation between the two components. The fan hub 14 also includes hub portion 38 that by way of a snapper retainer ring 148 fixes in one direction the location of internal clutch hub 50 and prevents axial movement of the internal clutch hub 50 past the retainer ring 148 along the internal spline 52.

In this manner, the tapered roller bearings 40 may thereby also be loaded by the screw body 122 to a load of between no axial load or a state of axial tension or axial compression. Specifically, the internal clutch hub 50 along the other end engages the bearing race of tapered roller bearing 40, which has an outer race that axially engages with the retainer housing 24. As a result, rotational movement of the screw body 122 in one direction tends to pull and against the retainer housing 24 and therefore stretch the overall belt drive housing 20. As a result, the other tapered roller bearing 42 is also similarly affected as the outer race of tapered roller bearing 42 is positioned and engaged with an inner periphery surface of the drive housing 18. Tension is sequentially reacted to the shaft and bracket 30 where it is grounded to the mounting surface.

As a consequence, rotational movement of the screw body 122 in one direction will tend to unload the taper bearings and cause some degree of loosening or unloaded condition on the tapered bearings, whereas rotation in the opposite direction will tend to pull the drive housing 18 apart through the pulling action of the snap retainer ring 148 and thereby cause an axial load to develop on the races of the respective tapered rolling bearings 40 and 42.

To provide for desired performance, this axial load of the tapered roller bearings 40, 42 is set by an appropriate torque wrench that engages hex tool surface 150 on the outer periphery of the screw body 122 at the factory and during assembly. The torque of the screw body 122 may be preset to a predetermined level that ensures good life span and proper operating conditions for the respective tapered roller bearings 40, 42, to maximize lifespan. However, with the screw body 122 being fully exposed and on an external surface of the fan clutch assembly, the hex tool surface 150 may also be exposed and available.

To avoid ready access, the anti-tamper device 140 is positioned over the tool engaging surface which in this embodiment is hex tool surface 150. This obstructs use of the tool engaging surface to prevent load modification of at least some of the bearings such as one or both tapered roller bearings 40, 42.

In an embodiment, the anti-tamper device 140 may comprise an anti-tamper ring such as a removable snap ring 152 which is situated in an annular groove 154 that is formed sufficiently proximate the hex tool surface 150 to prevent use of the hex surface 150 by a tool such as a wrench or socket drive for example. Preferably, the annular groove 154 and snap ring 152 are placed at a front end of the hex tool surface 150 thereby preventing a socket from being fit on the front end of the hex surface.

Additionally, the axial length of the hex tool surface 150 is desirably limited in the axial length by the location of the snap ring 152 to avoid application of typical wrenches that are in typical mechanic's tool box for such service mechanics that service large engines. As can be seen, the hex tool surface 150 extends an axial length 158 that is smaller in the axial dimension than most typical thicknesses of wrenches that are used by most engine service mechanics. For this clutch package, normally the hex tool surface 150 will be of a size of at least one-half inch and may be three-quarters of an inch. For these hex sizes, a relatively large wrench is utilized and therefore, the uninterrupted axial extending length 158 is preferably no more than one-quarter inch to prevent interfacing with typical wrenches, and more preferably less than 0.15 inch. The available length is controlled by the snap ring 158.

Immediately behind the hex tool surface 150, is provided in enlarged circular section 156 which prevents tool access from that direction as well and thereby limits the axial length 158 as described above.

As alluded to above, a method of assembling the clutch assembly will preferably include first setting the threaded interface 142 of the screw body 122 to thereby load and set the position of the fan hub 14 and load on the tapered roller bearings 40, 42. This is typically done with a torque wrench on the hex tool surface 150 without the anti-tamper device or snap ring 152 installed. As will be appreciated, there are a variety of axial tolerances that are built up and therefore the distance between the screw body or fan hub relative to mounting bracket 30 may vary due to tolerance differences among parts. As a result, the transfer shaft 118 and the position thereof can axially be set by installing a screwdriver into the central opening 134 to move transfer shaft 118 and associated magnet wheel 116 and magnet 114 to position it precisely and accurately within bushing 120 and Hall Effect speed sensor 112. Thus, the tolerance stack up does not affect or impact setting the position of or alignment of the sensor assembly 110 that provides for reliable sensing.

Thereafter, the set screw 132 and snap ring 152 can be installed to prevent tampering with either of these settings.

Further the cover plate 136 may be then installed after the settings are accomplished.

If per chance the fan clutch assembly does need to be serviced, it can be seen that the snap ring 152 can be removed but it requires an additional tool. The intuitive nature of the mechanic is not to access a surface which is not readily available where the snap ring is evident to simply limit access to that hex surface. Further, a label 160 may be provided to further reinforce that concept as shown in FIG. 19. However, in the event it is necessary to service or torque the screw body 122 that can be done by removal of the snap ring 152 by a snap ring removal tool which then opens up the hex surface for tool engagement if necessary.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A clutch assembly for a cooling fan, comprising:
   a drive housing having a belt drive input;
   a drive body output for driving the cooling fan;
   a clutch within the drive housing, the clutch having an engaged state in which the belt drive input rotationally drives the drive body output, and a disengaged state in which the belt drive input is rotationally disengaged with the drive body output;
   a piston assembly comprising a piston support body and a piston moveable relative to the piston support body with a working fluid chamber defined therebetween, the piston acting upon the clutch to transition the clutch between the engaged state and the disengaged state; and
   a lubrication passage running through the drive housing and into a lube collection region defined radially between the drive housing and the piston assembly; and
   a collection passage extending radially through the piston, the collection passage having an inlet port exposed to the lube collection region.

2. The clutch assembly of claim 1, wherein the inlet port is defined along an outer radial periphery of the piston.

3. The clutch assembly of claim 2, wherein the outer radial periphery of the piston includes a step surface proximate the lube collection region, the step surface providing an radially extending impact surface arranged to guide lube oil into the collection passage during rotation of the drive housing.

4. The clutch assembly of claim 1, wherein the collection passage includes a first portion defined by the piston and a second portion defined by the piston support body, the first and second portions in radial alignment and communication.

5. The clutch assembly of claim 4, wherein one of the piston and the piston support body define a groove at an interface between the piston and the piston support, and wherein the groove provides for continuous fluid communication through the collection passage at the interface.

6. The clutch assembly of claim 5, wherein at least one of the piston and the piston support include an enlarged recess at the interface that is sized large enough in an axial dimension to maintain continuous fluid communication the collection passage for an entire range of sliding movement between the piston and the piston support body.

7. The clutch assembly of claim 4, further comprising a stationary support shaft, the piston support body fixed in surrounding relation of the stationary support shaft, the stationary support shaft including a port communicating with the second portion for returning lube oil collected from the collection region by the collection passage.

8. The clutch assembly of claim 1, wherein an outer periphery of the piston defines a surface forming a scoop at the inlet port.

9. The clutch assembly of claim 1, further comprising a sensor assembly comprising a transfer shaft having a first end portion coupled to the drive body output such that the transfer shaft and the drive body output rotate in unison, and a second end portion carrying a sensor target, and a sensor arranged in sensory communication with the sensor target.

10. The clutch assembly of claim 9, further comprising a stationary support shaft, the drive body output including a hub portion in surrounding relation of the stationary support shaft with bearings therebetween to facilitate rotation drive body output relative to the stationary support shaft.

11. The clutch assembly of claim 10, wherein the transfer shaft of the sensor assembly extends through the stationary support shaft.

12. The clutch assembly of claim 9, further comprising a screw body coupling the drive body output to the transfer shaft, wherein the screw body comprises a first threaded coupling with the drive body output and a second threaded coupling with the transfer shaft.

13. The clutch assembly of claim 12, further comprising tapered roller bearings supporting the drive housing for rotational movement relative to the stationary support shaft and the drive body output, the screw body being set to axially load the tapered roller bearings to a predetermined load determined by an amount of threaded engagement at the first threaded coupling, and wherein the second thread coupling is set to axially align the target and the sensor.

14. A method of assembly of the clutch assembly of claim 12, comprising:
  setting the first threaded coupling at a selected load to pre-load at least one set of bearings that facilitate relative rotation between the drive body output and the drive body housing or a stationary support therefore; and thereafter
  setting the second thread coupling linearly translate the transfer shaft to axially align the sensor in sensory communication with the sensor target.

15. The clutch assembly of claim 9, further comprising a magnet wheel affixed to the second end portion, the magnet wheel extending radially outward from the transfer shaft and having a magnet element.

16. The clutch assembly of claim 15, further comprising a bushing secured to the stationary support shaft supporting the magnet wheel for rotational movement at the second end portion.

17. The clutch assembly of claim 9, wherein the transfer shaft extends through the piston assembly and a stationary support shaft.

18. The clutch assembly of claim 1, further comprising a stationary support, and bearings supporting the drive body output for rotation relative to the stationary support;
  a screw body secured to the drive body output via a first threaded coupling with the drive body output, the first threaded coupling controlling load on at least one of the bearings, the screw body having a tool engaging surface; and
  an anti-tamper device positioned over the tool engaging surface and obstructing use of the tool engaging surface to prevent load modification of at least some of the bearings.

19. The clutch assembly of claim 18, wherein the tool engaging surface comprises a hex surface for engaging a wrench or socket, and wherein an annular groove is formed sufficient proximate the hex surface to prevent use of the hex surface, the anti-tamper device comprising an anti-tamper ring mounted in the annular groove.

20. The clutch assembly of claim 19, wherein the anti-tamper ring is a removable snap ring that enables access to the hex surface for serviceability.

21. The clutch assembly of claim 19, wherein the hex surface comprises an uninterrupted axially extending length, the anti-tamper ring limiting the uninterrupted axially extending length to no more than ¼ inch to prevent interfacing with wrenches.

22. The clutch assembly of claim 21, wherein the hex surface is an external surface facing radially outward having a width of at least about ½ inch for engagement with a ½ inch wrench or socket when anti-tamper ring is removed for service.

23. The clutch assembly of claim 19, wherein the anti-tamper ring is arranged at a front region of the hex surface to prevent operative engagement with a socket wrench.

24. The clutch assembly of claim 18, further comprising a stationary support shaft, the drive body output including a hub portion in surrounding relation of the stationary support shaft with bearings therebetween to facilitate rotation drive body output relative to the stationary support shaft, the bearings including tapered roller bearings supporting the drive housing for rotational movement relative to the stationary support shaft and the drive body output, the screw body being set to axially load the tapered roller bearings to a predetermined load determined by an amount of threaded engagement at the first threaded coupling.

* * * * *